United States Patent [19]
Glista

[11] Patent Number: 5,229,875
[45] Date of Patent: Jul. 20, 1993

[54] FAULT-TOLERANT FIBER OPTIC COUPLER/REPEATER FOR USE IN HIGH SPEED DATA TRANSMISSION AND THE LIKE

[76] Inventor: Andrew S. Glista, 4126 Whispering La., Annandale, Va. 22003

[21] Appl. No.: 572,384

[22] Filed: Aug. 27, 1990

Related U.S. Application Data

[63] Continuation-in-part of Ser. No. 357,959, May 30, 1989, Pat. No. 5,020,152.

[51] Int. Cl.⁵ ............................................. H04B 10/08
[52] U.S. Cl. ..................................... 359/110; 359/179
[58] Field of Search ............... 359/110, 119, 161, 173, 359/166, 174, 172, 179; 385/16, 31

[56] References Cited

U.S. PATENT DOCUMENTS

| | | | |
|---|---|---|---|
| 4,837,856 | 6/1989 | Glista | 359/119 |
| 5,020,152 | 5/1991 | Glista | 359/115 |

Primary Examiner—Edward L. Coles, Sr.
Assistant Examiner—Kinfe-Michael Negash
Attorney, Agent, or Firm—Terry M. Gernstein

[57] ABSTRACT

A fault-tolerant fiber optic coupler/repeater for use in a terminal in a high speed digital, audio or video data transmission system has optical data input from one or a plurality of upstream terminals and sends optical data to one or a plurality of downstream terminals via fiber optic lines. The terminal includes one or more bypass lines and is connected to the bypass line of at least one upstream terminal. The terminal receives optical data signals from upstream terminals via a primary line and one or more bypass lines which bypass one or more of the upstream terminals. The terminals includes a logic device which analyzes the signals received by the terminal via the primary line and via the bypass line and analyzes or compares these signals to preset values. The logic device selects the signal having characteristics closest to the preset values and rejects the other signals. The logic device likewise activates a built-in test circuit. If multiple signals are rejected for not having characteristics within a preset range, all of the data is rejected. The selected primary or bypass signal is sent to an input/output device such as a computer or television.

17 Claims, 15 Drawing Sheets

FAULT-TOLERANT FIBER OPTIC COUPLER/REPEATER FOR USE IN HIGH SPEED DATA TRANSMISSION AND THE LIKE

The present application is a continuation-in-part application of Ser. No. 07/357,959, filed on May 30, 1989, now U.S. Pat. No. 5,020,152.

TECHNICAL FIELD

The present invention relates in general to data transmission systems in which a plurality of data terminals (N greater then 16) are interconnected by optical fiber transmission links, and relates more particularly to such a data transmission system for use in high speed, digital, audio or video data transmission.

BACKGROUND ART

Optical data fiber transmission (e.g. high speed data bus, high speed computer interconnect, local area networks (LAN), etc. has been limited by the availability of a fail-safe multiport optical coupler/repeater. Presently available LAN/data bus concepts have considered various optical energy distribution devices which can be categorized as: (a) passive power splitters (such as fused/biconical couplers) and (b) star couplers (reflective or transmissive) and (c) active repeaters. The devices falling into categories (a) and (b) have the advantage of being completely passive, however, the state-of-the-art of available power launched into an optical fiber, receiver sensitivity and dynamic range and connector, coupler and fiber loss limits the utility of these devices for multiterminal Local Area Networks.

The devices in category (c), active repeaters, lend themselves to high speed multichannel (N greater than 16) linear or ring network topologies, but the integrity of the network is limited by a single point failure in the fiber or a component or power supply in the active repeater.

A fail-safe switch in the data bus terminal has been used to overcome the last-mentioned problem. Such fail-switches have been mechanically or electro-optically actuated switches, and have the drawback of complicating the timing, the synchronization schemes, and/or the signal-to-noise ratio of the overall network. Furthermore, these switches may limit data bus or pipeline speeds as they are slow. Still further, mechanical switches or active repeaters may have a tendency to fail in an "on" mode, thereby swamping a downstream terminal, and are somewhat susceptible to vibration and other such mechanical interference. This last drawback may limit the acceptability of such switches in applications, such as military, where such failures may be totally unacceptable.

Presently, available fail-safe switches cannot accommodate faults, such as a failure in an upstream port in a manner which is both rapid enough for modern technology and which is also rapid and energy-efficient. The mechanical devices are not fast enough for modern applications, and still are susceptible to failure inducing conditions as above discussed. While electro-optical devices may be faster than the mechanical devices, these switches suffer the drawback that they severely limit the distance between stations because they are quite lossy. Often, such switches are active and thus require power for operation, thereby presenting several drawbacks.

A further problem with presently available fail-safe switches used in such systems is that they are not capable of accommadating the "stuck-on" condition of an upstream terminal. As mentioned above, the mechanical switches are susceptible to failure in the "stuck-on" condition. Thus should an upstream terminal fail in the stuck-on mode, presently available fail-safe switches may not be able to accommodate such a condition since many of these switches are set ip to determine only if the data being sent to a terminal is "good" and not if there is a swamping condition present in which to much "good" data is being sent to the terminal.

Some presently available terminals have attempted to overcome these problems by providing a fault-detection system within the terminal that samples the signal from one of several redundant receiver/transmitter units within that terminal and then uses the most acceptable signal. Such fault detection systems, while serving to overcome the signal problem at each terminal are often active thereby requiring additional backup power and may also be expensive. Still further, such fault-detection systems make no provision for a total failure of the particular terminal. That is, if the terminal suffers a total failure, all downstream terminals are affected.

Therefore, there is need of a fault-tolerant coupler/repeater for use in high speed optical fiber data transmission systems which is fast enough and which is reliable enough for modern needs, yet which is not unduly lossy or expensive in nature.

OBJECTS

It is a main object of the present invention to provide a fail-safe data bus terminal which allows multiterminal optical fiber distribution without the disadvantages of the presently available devices.

It is another object of the present invention to provide a fail-safe switch which is capable if discriminating between signals and using the best signal for an associated data bus terminal.

It is another object of the present invention to provide a fault/tolerant terminal which includes logic for discriminating between incoming signals.

It is another object of the present invention to provide a fail-safe data bus terminal which has means for providing totally redundant data lines.

It is another object of the present invention to reduce noise in a terminal.

It is another object of the present invention to provide a programmable optical interconnect means based upon predetermined optical power levels or any selected reference or criterion.

It is another object of the invention to provide a fault tolerant physical layer for fiber optic networks.

It is another object of the invention to provide a fault tolerant fiber optic distribution system for community antenna television (CATV) systems.

It is another object of the invention to provide a programmable fault tolerant electro-optic packaging and interconnect system for advanced computers and signal processors.

SUMMARY OF THE INVENTION

These and other objects are accomplished by a terminal which includes multiple detectors and logic circuitry for determining power in two or more input lines connected to that terminal. The logic circuitry determines the ratio of optical power in the lines or the average power in either line to determine if it is proper, and does not require conversion of an optical signal to an electrical signal to achieve fault tolerance if the ratio or average power is improper. An optical logic device may also be utilized to determine the power ratio in the lines.

The logic circuitry is preset so that if power in any of the input lines is outside of a preset range as determined by optical power ratio in the lines or average power in either line, the data from another line is selected for use in the terminal. Thus, if the power in a particular input line is too low due to the failure or degradation of an LED, laser, electrical component or fiber, or too high due to a stuck-on failure in a previous terminal, the data in that line will be rejected and not used in that terminal. The logic circuitry is also arranged so that, if several of the data signals being input to the terminal are unacceptable, these signals will be rejected and signals from the last working terminal will be sent on past the terminal via a bypass line. On the other hand, if all of the input data signals are acceptable, the logic circuitry is arranged to use the "best" one of these signals or the sum of all the signals if identical. That is, the signal or sum of the signals that is closet to the optimum signal will be selected, and the rest of the signals will be rejected. In the case of a power failure, the bypass enables a signal to reach the succeeding terminal by totally possible means. In addition to power monitoring, suitable photodiodes and logic can likewise be utilized to monitor optical wavelength or polarization for fault detection.

DETAILED DESCRIPTION OF A PREFERRED EMBODIMENT

Figure 1:
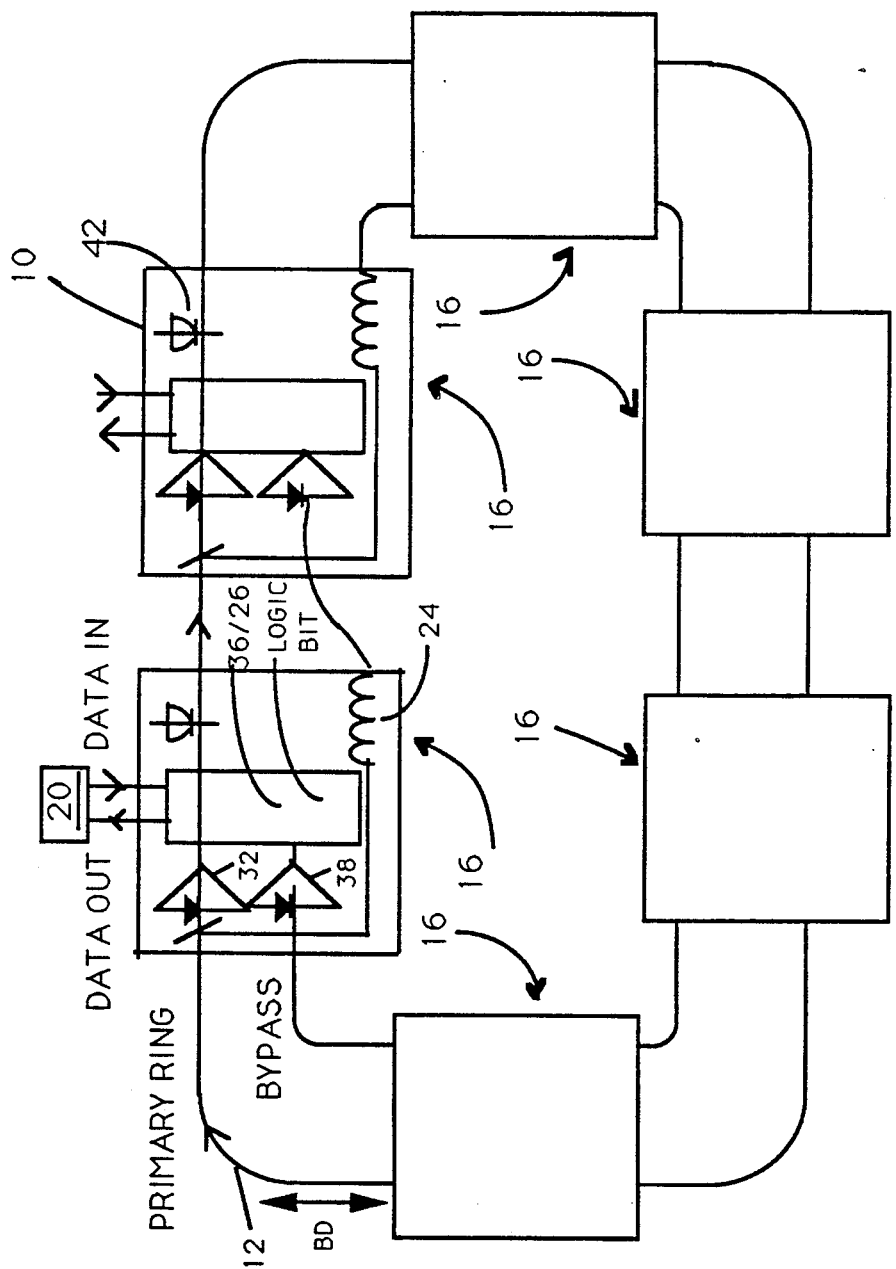
FIG. 1 is a schematic of a ring bus data transmission system in which the terminal embodying the teaching of the present invention is used.

Shown in FIG. 1 is a high speed data transmission system 10 which is in the form of a ring bus and uses fiber optic lines 12 and 14 to transmit data between N terminals 16. In the system 10, line 12 is the primary ring and line 14 is a bypass ring. The lines 12 and 14 are totally redundant and separate whereby a totally redundant data transmission system is formed. Each of the N terminals 16 uses data in the usual manner and includes the usual data input/output mechanisms and devices 20, such as a computer or the like.

Each terminal 16 includes connection means to which the lines 12 and 14 are connected, and can be a unitary element formed of components embedded in a substrate as will be discussed below. There are N terminals with the data transmission direction proceeding from terminal (N−1) to terminal (N) to terminal (N+1) in the downstream direction.

Figure 2:
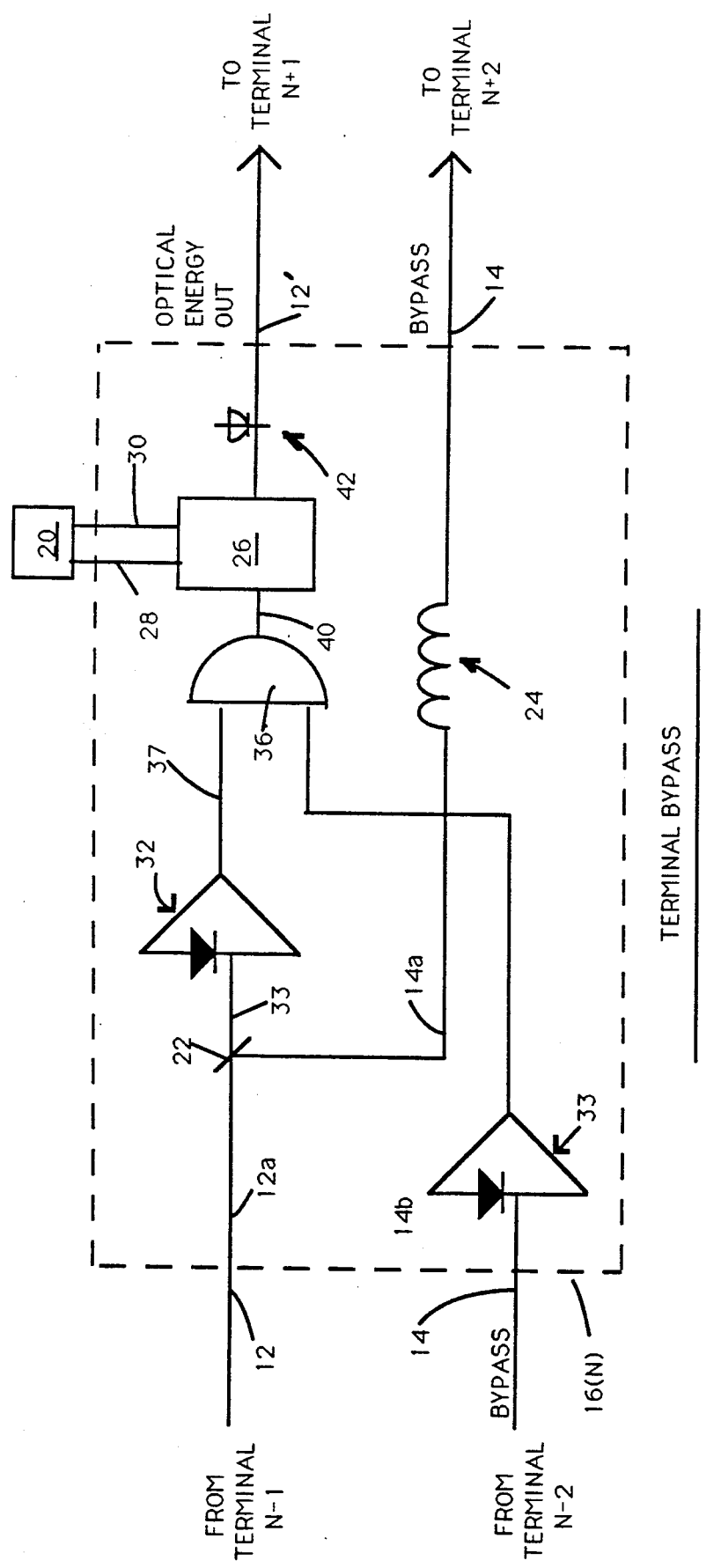
FIG. 2 is a schematic of a data terminal of the FIG. 1 ring bus system.
Figure 11:
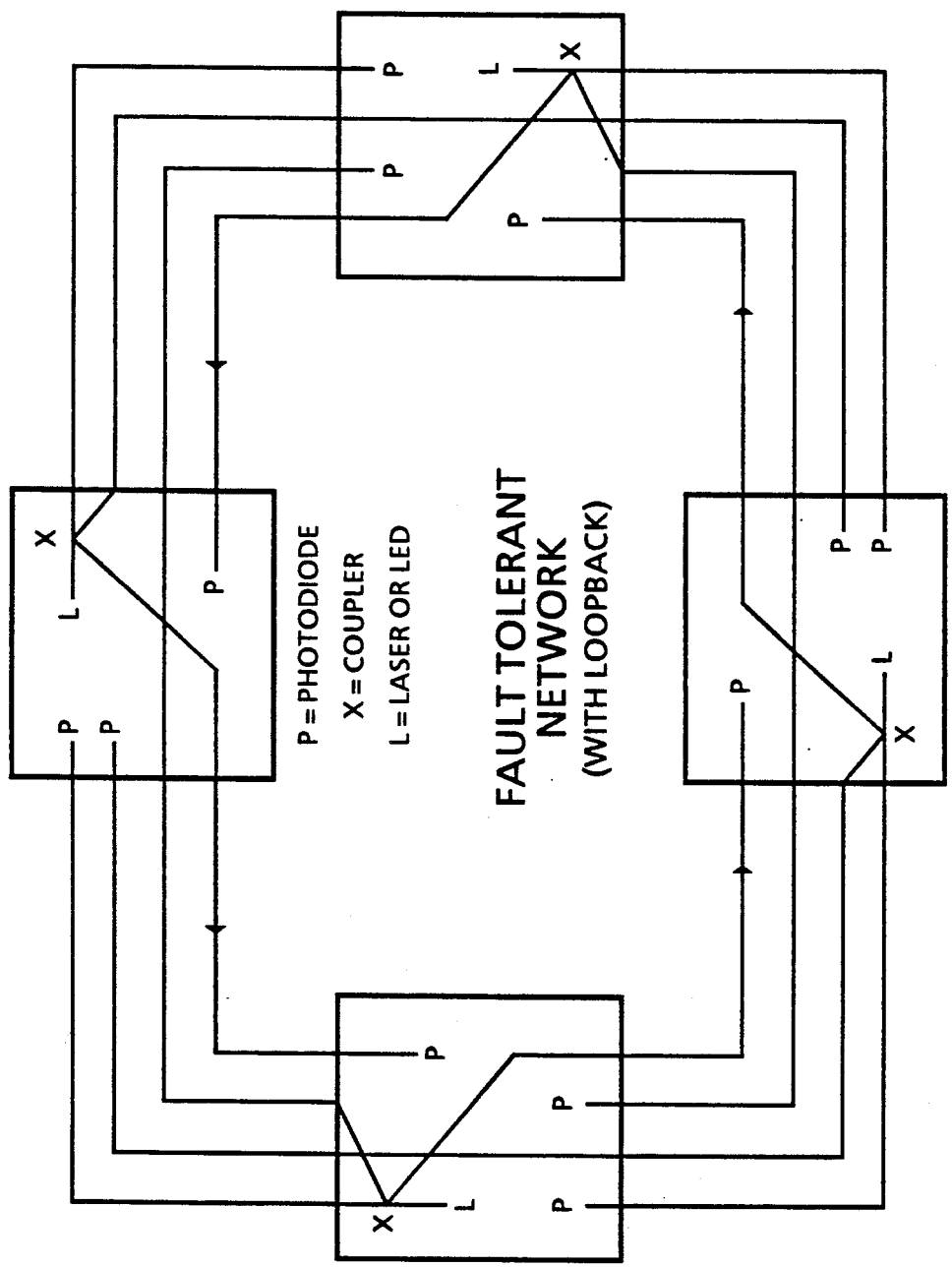
FIG. 11 is a schematic of a bidirectional fault tolerant terminal utilizing electrical logic select means wherein the coupler is placed in the primary line following the laser or LED.

A terminal 16 is best shown in FIG. 2 and attention is now directed thereto. The terminal shown in FIG. 2 is the Nth terminal, and has data input from terminal (N−1) via the optical fiber of primary ring 12 and from terminal (N−2) via the optical line in bypass ring 14. Data is then transmitted to terminal (N+1) via primary ring optical line d' and to terminal (N+2) via bypass ring optical fiber line 14. A power splitting device, such as a fusion coupler 22, is coupled to the primary line 12 by a coupling line and means 12a and couples that primary line 12 to a bypass coupling line and means 14a which is coupled to the bypass ring optical fiber line 14 for the purpose of having a signal bypass the terminal. The coupler, or couplers, can be located outside the terminal to avoid single point failure if required. FIG. 11 shows a configuration where the coupler is placed in the terminal folowing the laser or LED. This configuration has advantages in providing added redundancy in the primary line if desired as well as the capability for bidirectional transmission. It also provides the capability to provide loopback if the entire cable is severed.

A delay means 24 can be positioned in the line and means 14a if desired. The fusion coupling 22 and the delay means 24 are known per se, and thus will not be discussed, it being mentioned only that the coupling can be arranged to divide the data into any desired ratio, and the delay means can be arranged to introduce any desired delay into the data signal being transmitted on the bypass line from terminal N to any other terminal. Data from an upstream terminal which is not adjacent to the incident terminal (e.g., the (N−2) terminal) on the bypass line 14 is coupled to the terminal via bypass coupling and means 14b.

The input/output mechanism and/or device 20 receives and sends data from and to a filter or signal shaping circuits 26 or like mechanism or device via input use line 28 and output use line 30. This portion of the terminal can be any suitable element or combination of elements, and will not be discussed further.

Figure 12:
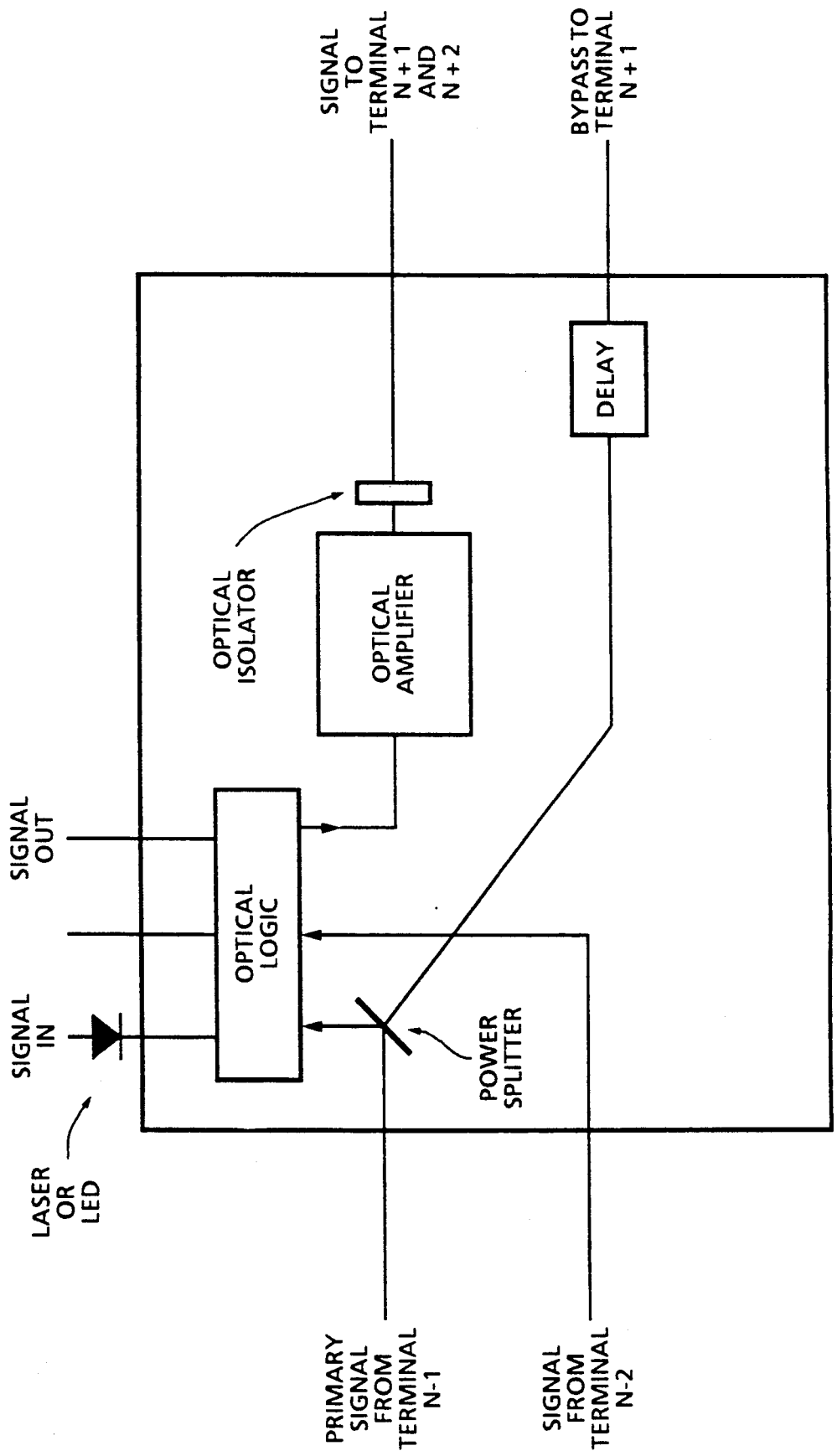
FIG. 12 is a single bypass fault tolerant terminal which utilizes optical select logic and an optical amplifier.
Figure 14:
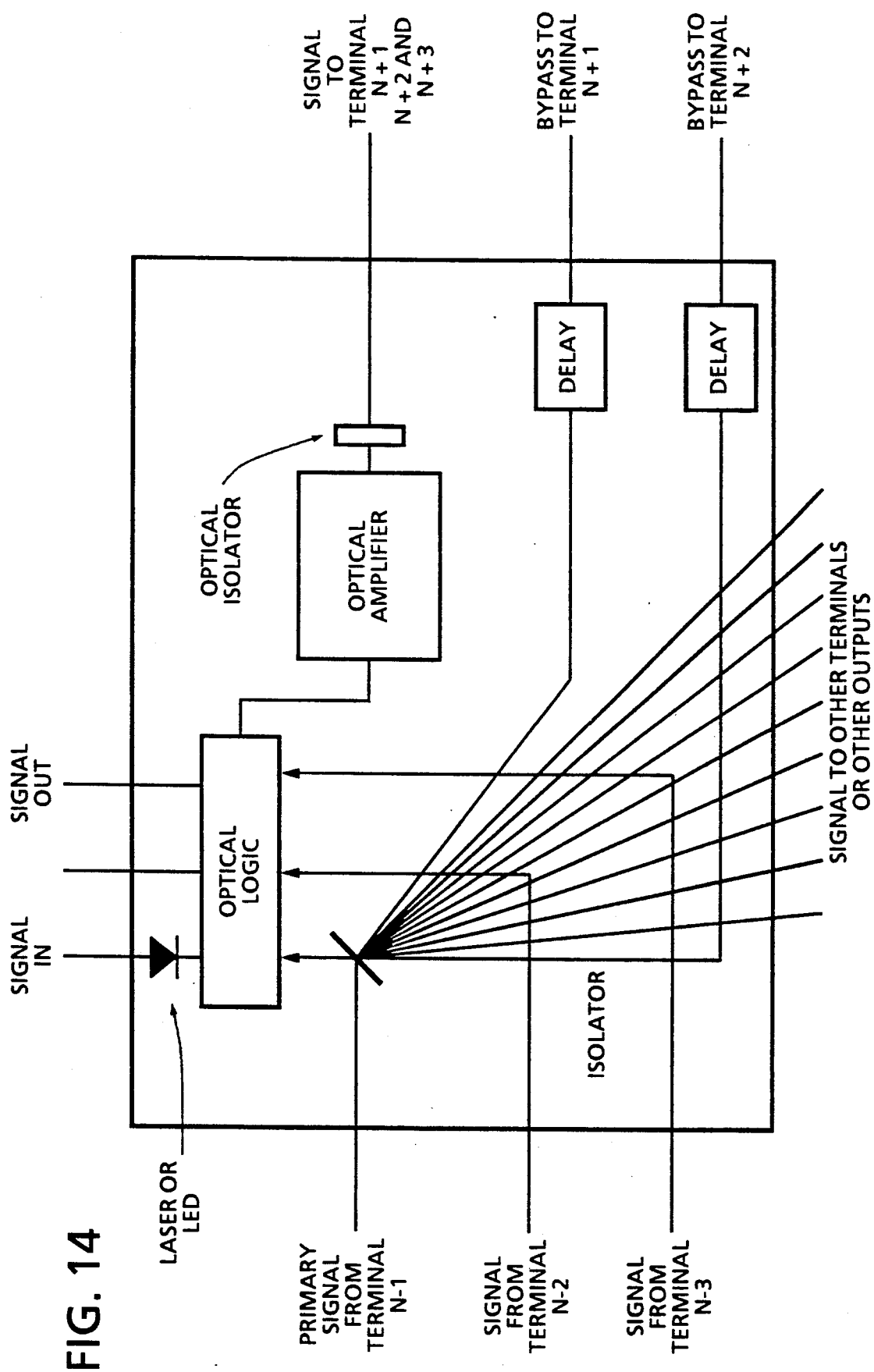
FIG. 14 is a schematic of a multiple bypass terminal which utilizes an optical logic select means and an optical amplifier as the means to boost the signal from the terminal (N−1), (N−2), or (N−3). It also provides a branching means for signal distribution such as might be utilized in an interactive community antenna television system (CATV) system.

Data on the primary line 12 is transmitted from the fusion coupling to a photo diode 32 via a line 33 and from such photo diode to a logic circuit 36 via line 37. Data on the bypass line 14 is transmitted from terminal (N−2) via the means 14b to a photo diode 38 and then via line 39 to the logic circuit 36. The logic circuit 36 determines which of the data signals from either line 12 or from line 14 is to be used by the terminal N and passes that signal on the filter 26 via data line 40 for use by the input/output mechanism 20. An optical source 42 is positioned in the primary line 12' to transmit output from the terminal N or boost signal from terminal (N−1). An alternative means of boosting power in a given terminal is through the use of an optical amplifier. This device does not require conversion of an optical signal to an electrical to achieve fault tolerance. Such devices also serve to reduce noise in a terminal. One example is a Fabry-Perot interferometer amplifier consisting of a gain cavity fabricated with the appropriate semiconductor material with an electrical or optical pumping means. Another example is an optical fiber amplifier consisting of a rare earth doped fiber cavity and suitable optical pumping means. Other optical amplifiers include stimulated Raman amplifiers and Kerr effect amplifiers and all of the above such devices are known per se and will not be discussed further but are mentioned as alternative sources for boosting power in a terminal. FIG. 12 is a schematic of a single bypass fault tolerant terminal utilizing an optical amplifier to reduce noise and to eliminate the need for conversion of an optical signal to electrical to achieve fault tolerance. FIG. 14 is a schematic of a multiple bypass fault tolerant terminal utilizing an optical amplifier. The use of optical amplifiers is especially useful in analog video distribution such as community antenna television (CATV) systems where electronic conversion of signals can cause noise or distortion limiting the number of terminals or signal quality.

The logic circuit 36 receives the primary signal from terminal (N−1) via the photo diode 32 and the bypass signal from another terminal, such as terminal (N−2), via photo diode 38, analyzes those two signals, rejects the signal having a power which is out of a preset ratio and uses the other signal for the terminal N. In this manner, a weak signal, an interrupted signal, or even a signal which is too powerful, can be rejected and will not be passed on for use by the device associated with the terminal N. Only a signal having a desired (instantaneous of average) power will be used. The logic circuit 36 can be set to select the signal to be used by the terminal N according to any standard, such as instantaneous or average power, range, noise, spectral content or the like. Only data signals having the desired characteristics will be used and all others will be rejected by the logic circuit 36. Furthermore, the logic circuit 36 is arranged to reject several of the input signals if none of these signals fall within the preset range. Still further, the logic circuit 36 is also arranged to use the signal that is closest to a preset optimum if all of the signals are otherwise acceptable. If multiple signals from previous terminals are rejected, these terminals are, in essence, shut down, and the logic circuit can include some means for transmitting a Built-In-Test signal telling any or all downstream terminals of the failure. The remaining bypass line or lines can then be used for keeping the ring intact.

Figure 3:
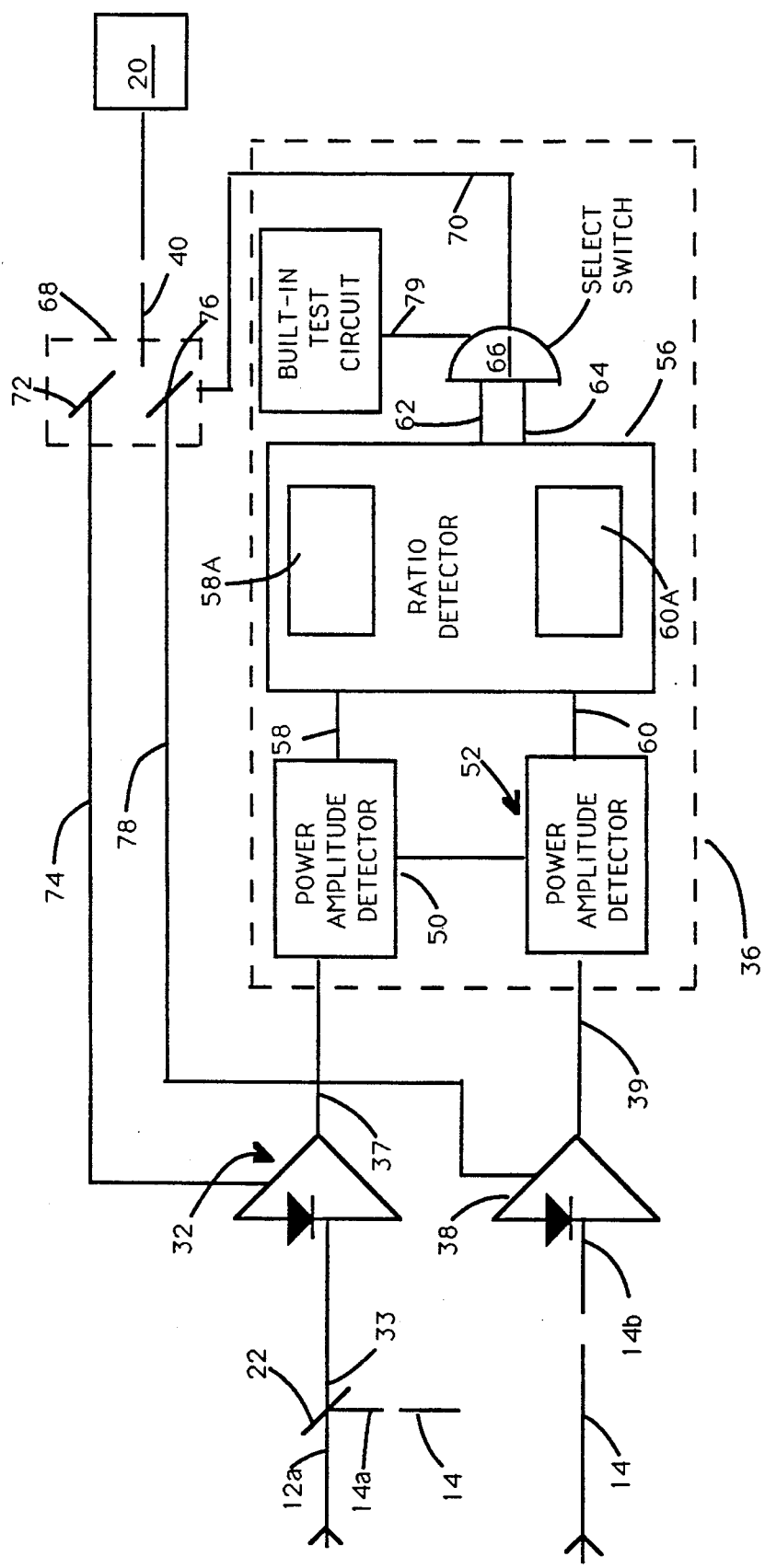
FIG. 3 is a schematic of the logic circuitry used in the terminal of the present invention.
Figure 4:
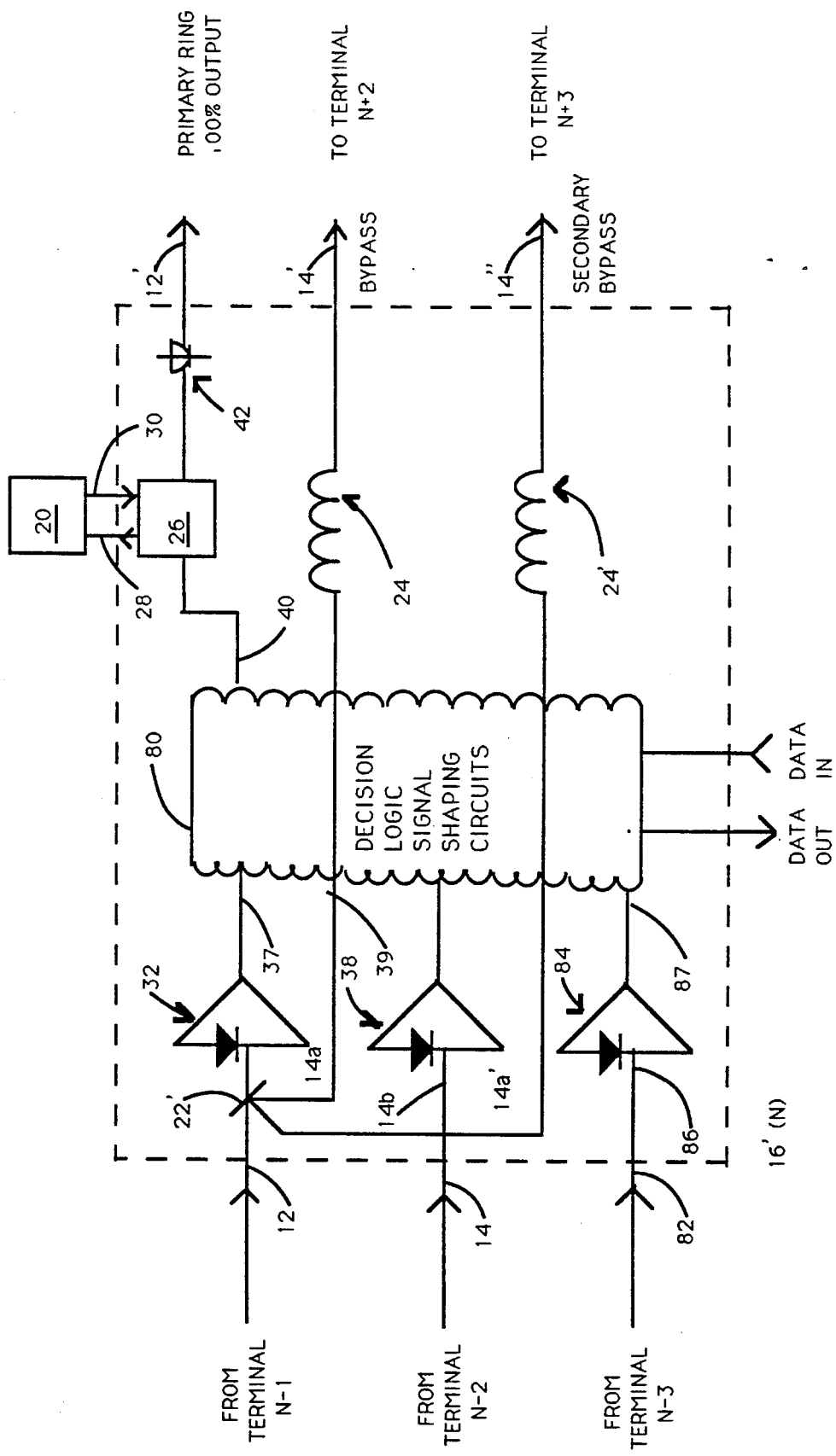
FIG. 4 is a schematic of a terminal in a data transmission system using at least three input lines.

The logic circuit 36 is best shown in FIG. 3, and attention is now directed to that figure. As discussed above, data line 40 is connected to the input/output device 20 associated with the terminal N via a filter, signal shaping circuit or other such equipment as necessary and data to be used by that mechanism is transmitted thereto over line 40. The data to be placed on line 40 comes either from the primary line 12 via line 33 or from bypass line 14 via line 14b depending on the instantaneous or average power, noise, etc. in these signals. The logic circuit 36 chooses the more desirable data signal and rejects the other, or several if necessary, as is the case in multiple bypass systems (see FIG. 4).

To accomplish this result, the logic circuit includes power detector circuits 50 and 52 connected to photodiodes 32 and 38 respectively via lines 37 and 39 respectively. These circuits measure the instantaneous amplitude of the light or integrated average power of the light. A suitable optical device can also be used for this purpose thereby avoiding the problems associated with translation of optical to electrical signals.

Figure 13:
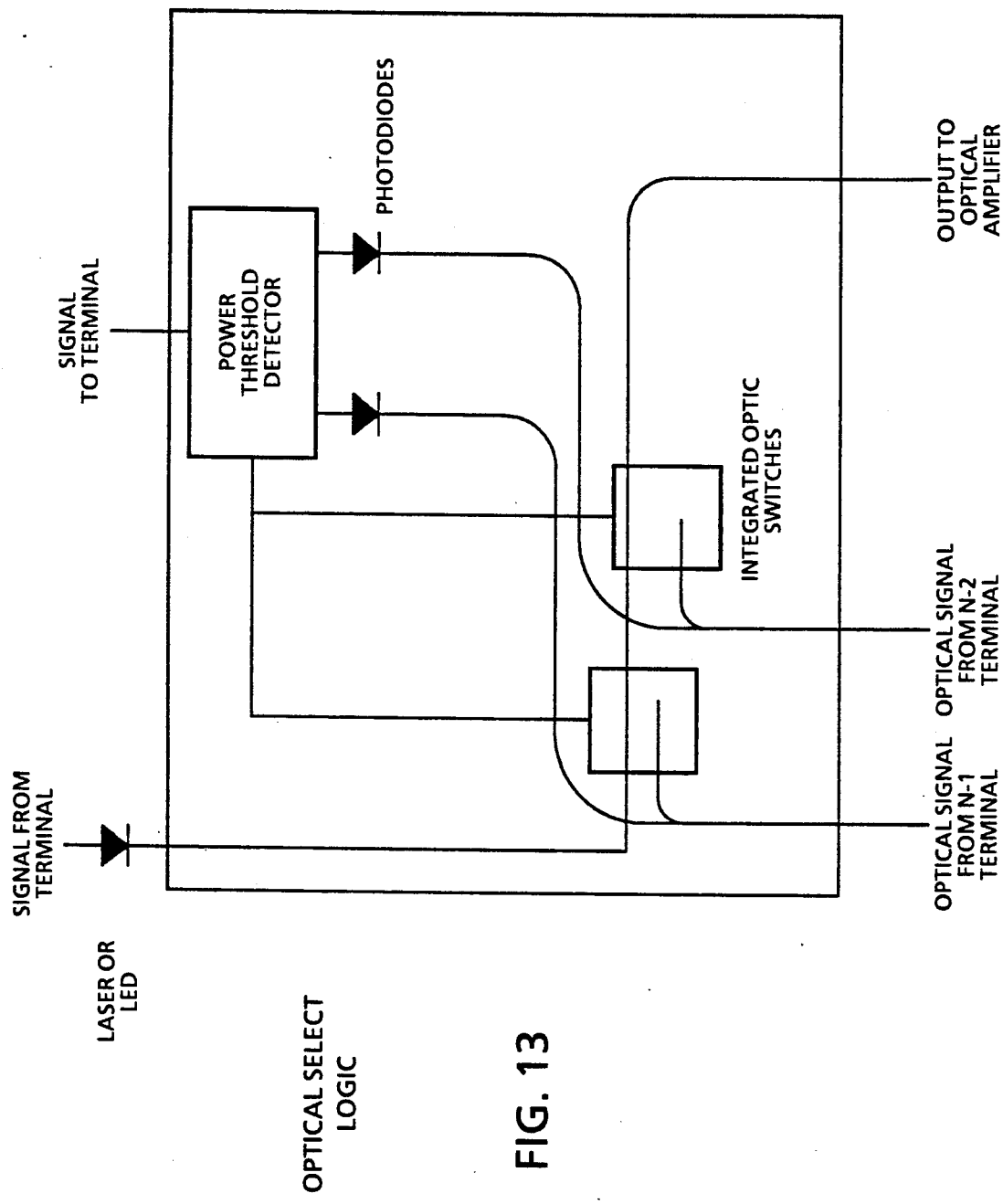
FIG. 13 is a schematic of an optical select logic means for a single bypass terminal utilizing an integrated optic switch to switch the optical signal from the primary input fiber to the bypass fiber in case of a failure in the N−1 terminal.

The alternative optical logic select means avoids the problems associated with the translation of optical to electrical signals and is shown in FIG. 13. Such optical logic means are known per se and include bistable optical elements or optical threshold switches or integrated optical switches. The former are activated by the strength of the optical signal where the latter are activated by an electrical signal. These optical devices serve to switch the signal from the primary input fiber or bypass fiber to a fiber attached to the optical amplifier. The primary optical signal fiber is attached to a photodiode and is analyzed for the proper power, amplitude, frequency, etc. in the electrical domain. The input from the bypass fiber is likewise attached to a photodiode and its signal is likewise analyzed. A switching signal is then sent to the integrated optical switches which sends the signal from the primary or bypass optical fiber to the optical amplifier. Such an implementation eliminates the need for converting signals form the optical to electrical domain prior to amplification and thus limits the noise or distortion. This is especially useful in analog video transmission. FIG. 12 shows a terminal containing such optical logic select means.

The results of these analyses are fed to a power ratio detector 56 along lines 58 and 60. The power ratio detector 56 is preset proportional to the power division ratio in t;he coupler of the N−1 terminal and selects the proper data signal and, using either line 62 or 64, which will actuate logic select device 66 accordingly. The logic select device 66 controls a switch mechanism 68 via line 70. Power integrating pulse accumulation circuits (such as 58A or 60A) can be used to determine average power on the line and can detect an LED or laser which is "stuck-on" in a previous terminal. This circuit will also activate the logic select means. The switch mechanism 68 includes a switch 72 connected to the photo diode 32 by a line 74 and a switch 76 connected to the photodiode 38 by a line 78. The logic circuit can also include a built in test circuit connected to the select device 66 by a line 79 to be actuated in the event one of the data lines contains a data signal with undesirable characteristics. The built in test circuit can include a suitable visual and/or audible alarm to signal that a data signal on one or more of the data lines coming into the terminal has undesirable characteristics. The visual signal can include data as appropriate.

The switch select device 66 actuates either switch 72 in line 74 connected to the primary input line 12 or switch 76 in line 78 connected to the bypass line 14 to pass the data in such selected line to the input/output device via line 40. The logic circuit is shown as using power as the test for which data input line to use, but other indicia can be used as well. It is also noted that the dotted outline OL shown in FIG. 3 can also represent a monolithic chip incorporating the various elements of the circuit.

While the FIG. 3 logic circuit is shown as being used in conjunction with two input lines, these or more data input lines can be used. This situation is indicated schematically in FIG. 4. A logic circuit 80 is associated with terminal 16' and receives data from terminal (N−1) via the primary data line 12, from terminal (N−2) via bypass line 14, and from terminal (N−3) via a secondary bypass line 14, and from terminal (N−3) via a secondary bypass line 82. The logic circuit 80 samples those data and uses the data having the desired characteristics while rejecting the rest as above described in conjunction with the description of logic circuit 36. Accordingly, in addition to photo diodes 32 and 38, the terminal 16' includes a photodiode 84 connected to the secondary bypass line 82 by an input connection and means 86 and to the logic circuit 80 by a line 87. The logic circuit 80 samples the data from the photo diodes 32, 38, and 84, analyzes that data for the selected parameter, and selects the data having the desired characteristics while rejecting the other data. The selected data is transmitted to the device 20 via line 40 in the manner described above in regard to the logic circuit 36.

Since the terminal 16' is associated with three downstream terminals (N+1), (N+2), and (N+3) as well as with three upstream terminals (N−1), (N−2) and (N−3), the terminals 16' includes an additional bypass line 14a' connected to a fusion coupler 22', and, optionally, includes a delay means 24'. In the manner of terminal 16, terminal 16' can include a repeater 42 in the primary ring data line 12'.

As can be seen from this disclosure, a terminal N can be associated with any number of upstream terminals and/or with any number of downstream terminals and/or any combination thereof depending on the level of redundancy of fault tolerance required in the network. The logic circuit associated with each terminal can be programmed to accept and reject data from any of the upstream terminals based on any selected reference and to pass data on to any downstream terminal based on a selected criterion. In fact, a terminal N can be associated with selected ones of the upstream terminals (e.g., with terminals (N−1), (N−2), (N−4), (N−6) and so forth) and/or with selected ones of the downstream terminals (e.g., with terminals (N+1), (N+3), (N+5), and so forth), and there need not be a one-to-one or even any systematic, correspondence between terminals.

Figure 5:
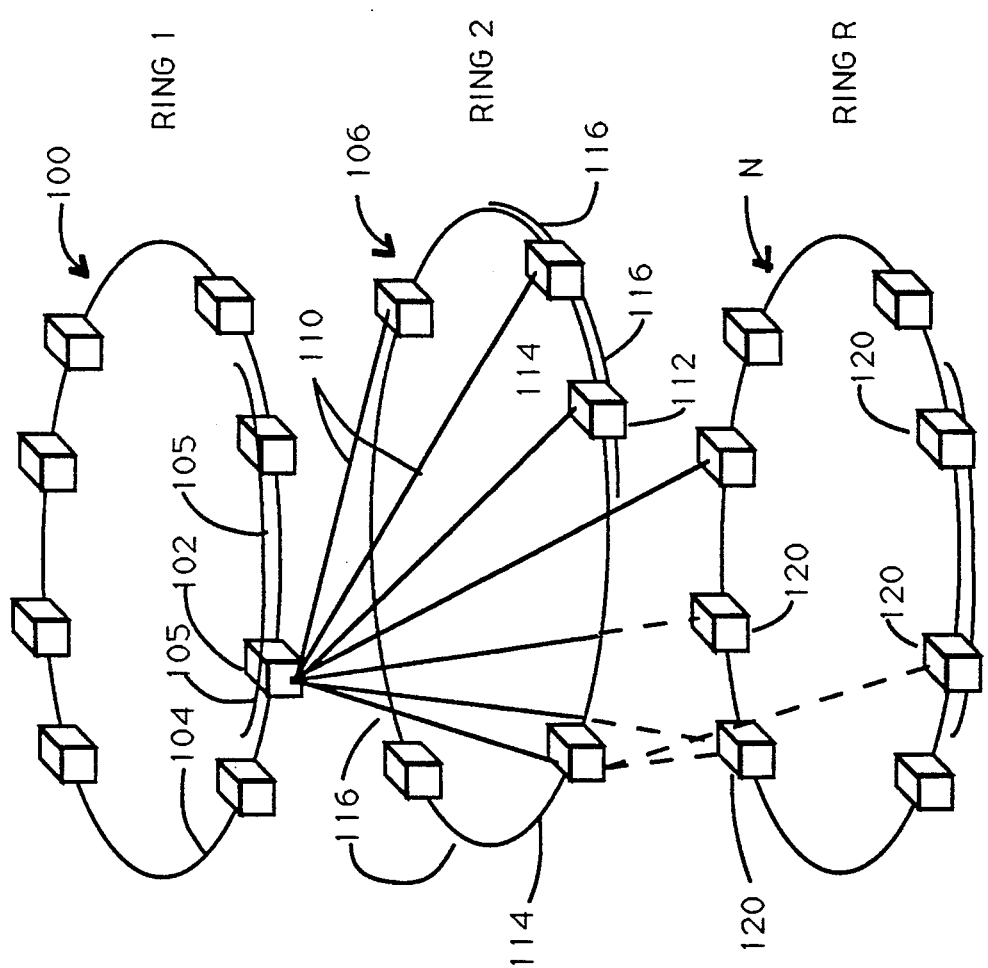
FIG. 5 is a schematic of a branched tree data transmission system.

Because the logic circuit of each terminals is so adaptable, it is ideally suited for use in a star-coupling arrangement. Such an arrangement is illustrated schematically in FIG. 5 in which a ring 100 includes N terminals 102 coupled to each other via a line 104 and can include one or more bypass lines, such as bypass line 105 in the manner discussed above. However, ring 100 is also coupled to other rings, such as ring 106 via the terminals and lines, such as line 110 connecting the terminal 102 to any or all of the terminals, such as terminal 112 of the ring 106. The terminals of the ring 106 can be interconnected with each other via a primary line 114 and a bypass line 116 as discussed above. In this manner, each terminal of each ring can be interconnected to any or all of the terminals in all other rings of the configuration. This situation is illustrated in FIG. 5 by ring R having terminals 120 connected to each other and to each or any of the terminals in each or any of the other rings of the configuration.

Figure 15:
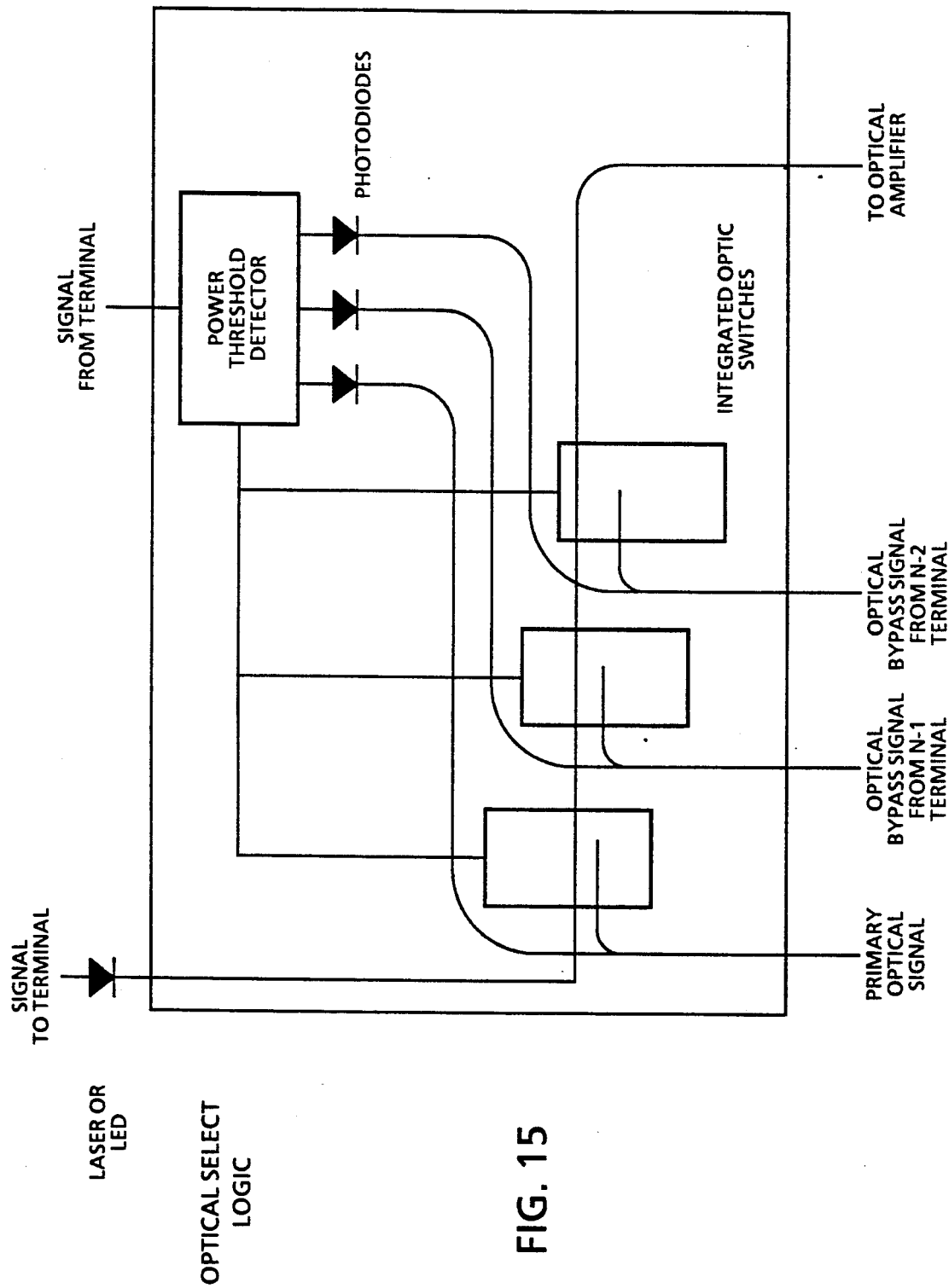
FIG. 15 is a schematic of an optical select logic means for a dual bypass terminal utilizing an integrated optic switch to switch the optical signal from the primary input fiber to either of the bypass fibers in case of a failure in the N−1 or N−2 terminals.
Figure 16:
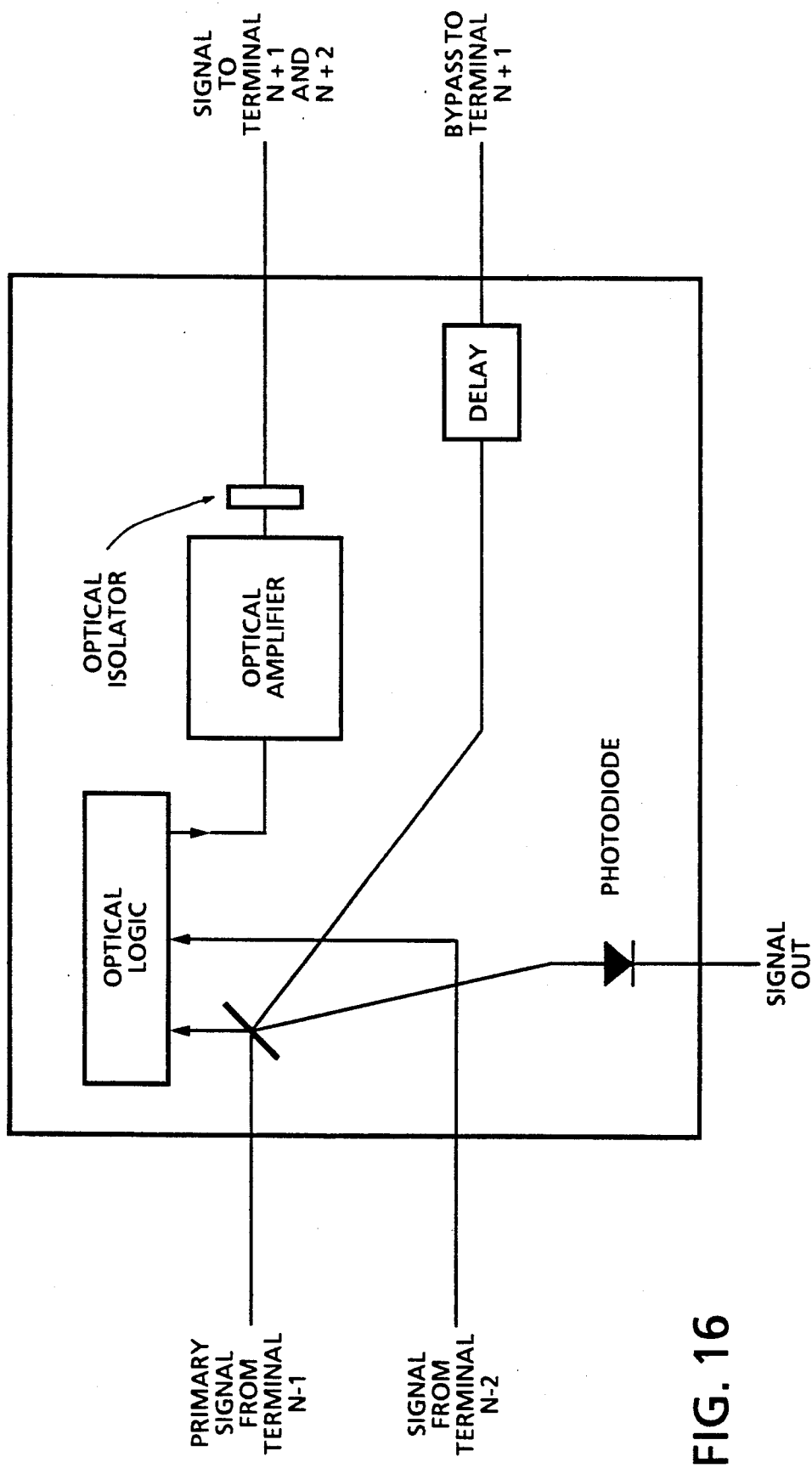
FIG. 16 is a schematic of a receive only fault tolerant terminal which utilizes optical select logic and an optical amplifier.

FIG. 14 is a schematic of a multiple bypass fault tolerant terminal with a star branching means which utilizes both optical logic for selection of the proper input signal as well as an optical amplifier to boost the signal in the primary optical fiber. This eliminates the need for an electrical switch select device and conversion of the signal from optical to electrical format prior to amplification thus reducing noise. Also shown in this figure is an optical isolator which may be utilized to suppress spurious reflections or feedback to the optical amplifier. This type of arrangement is ideally suited to the transmission of analog information such as the video signals utilized in community antenna television (CATV) systems. It is also ideal for interactive fiber-to-the home systems where two-way video is required. FIG. 15 is a schematic of the optical select logic means for a multiple bypass terminal. FIG. 16 shows a receive only terminal for receving signals transmitted by a primary distribution source and transmitted to a large number of users such as a community antenna television (CATV) system. The optical amplifier overcomes the transmission losses without adding noise to the signal while the optical logic switches the bypass into the circuit when a fault is detected.

The logic circuits associated with each ring can be adapted to discriminate and use the most desirable data for the associated terminal based on parameters unique to the ring, if suitable, or the test parameters can be similar for all rings, if desirable.

Figure 6:
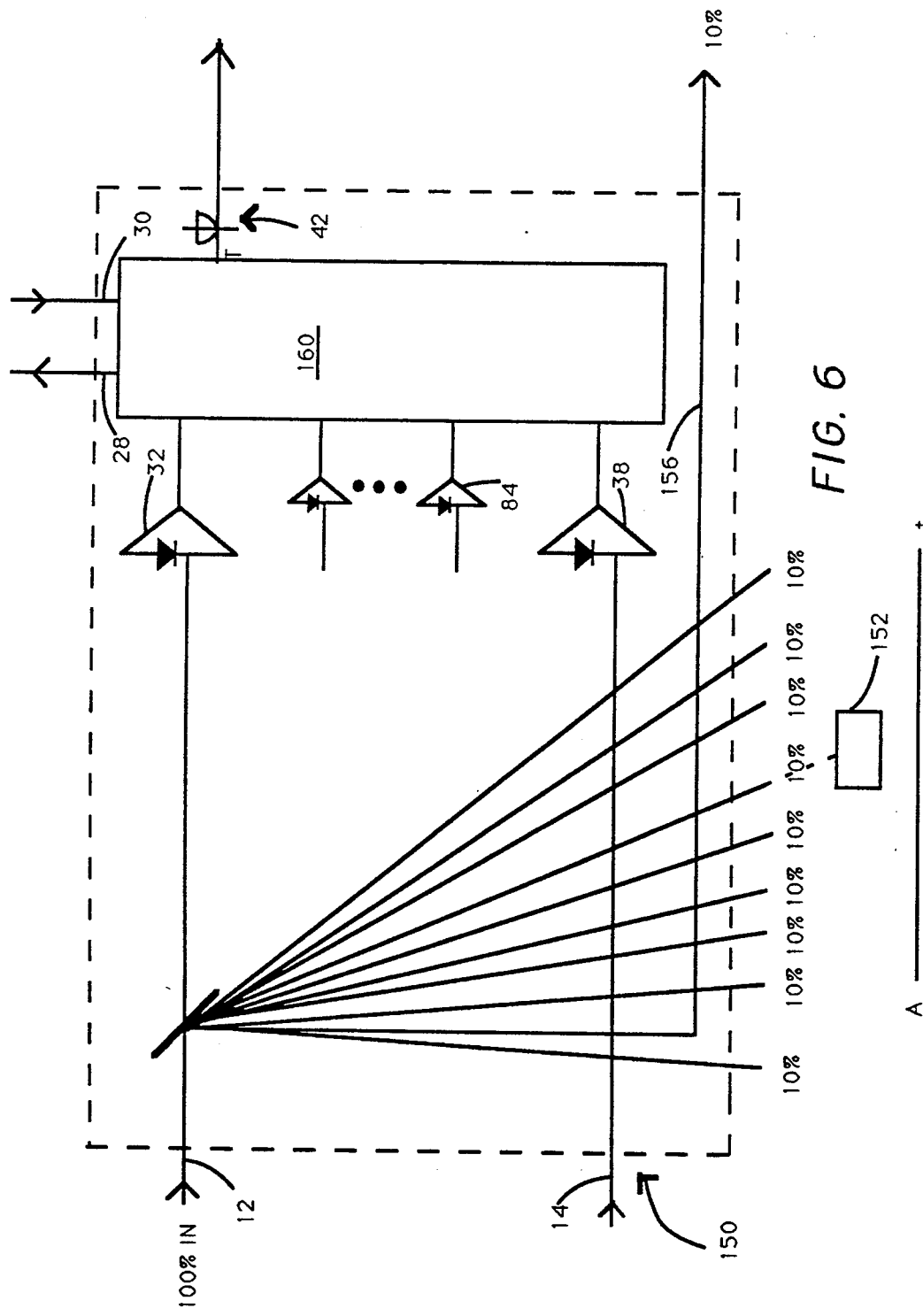
FIG. 6 is a schematic of one terminal of the FIG. 5 data transmission system.
Figure 8:
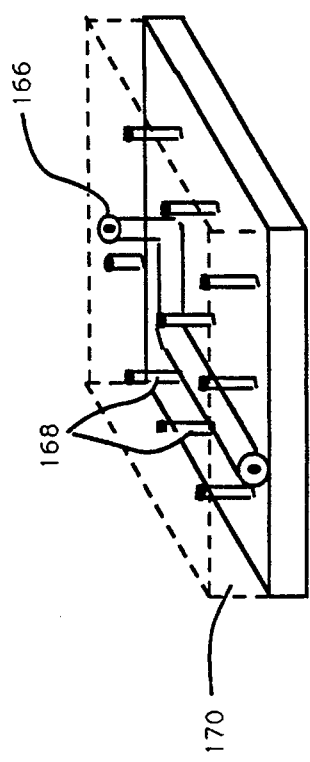
FIG. 8 is a schematic of another embedded system.
Figure 9:
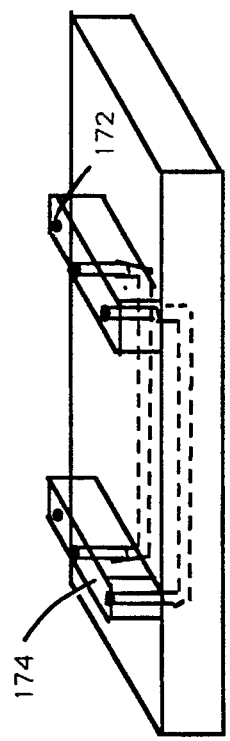
FIG. 9 is a schematic of a modular system with means for connecting other optical or electrical modules thereto.
Figure 7:
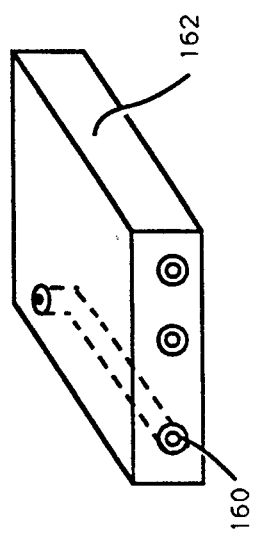
FIG. 7 is a schematic of an embedded system.
Figure 10:
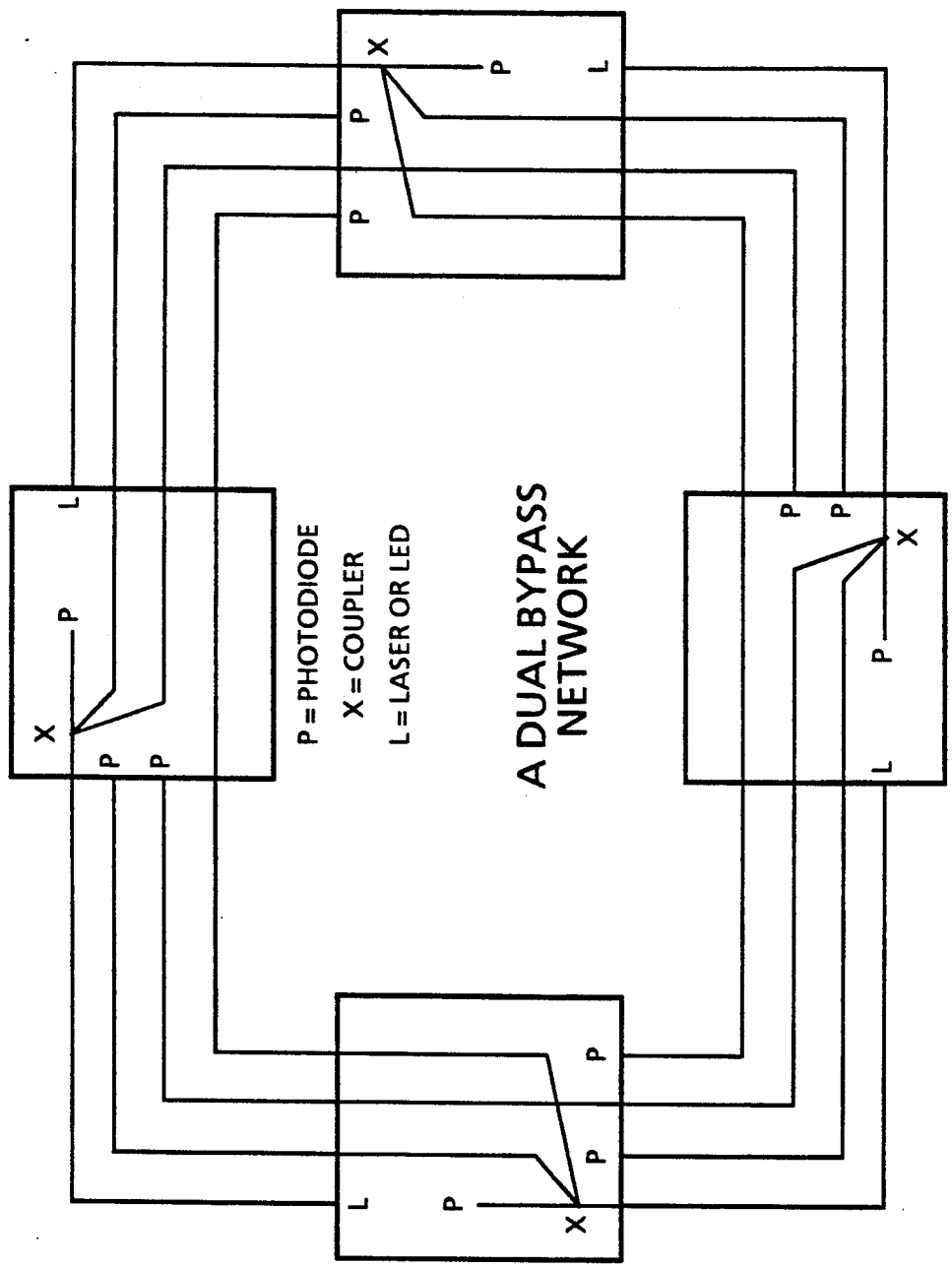
FIG. 10 is a schematic of a dual bypass ring bus data transmission system in which three input lines and photodiodes are employed.
Figure 17:
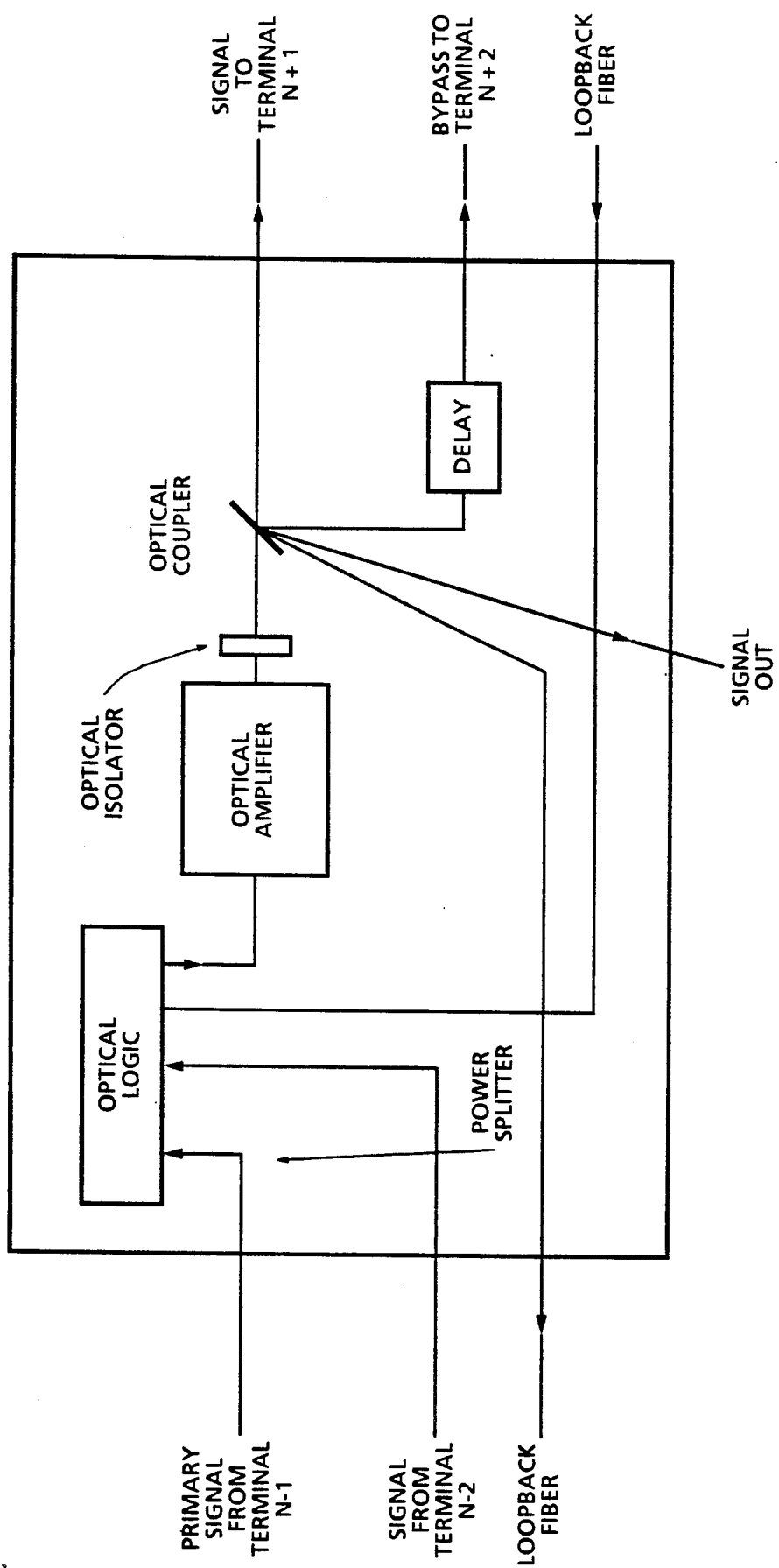
FIG. 17 is a schematic of a bidirectional terminal utilizing electrical select logic and an optical amplifier to boost the signal from the N−1 terminal.

The logic circuit associated with each terminal can be set to accept or reject data having any power level. Thus, if the power of any signal is descreased due to the just-described coupling, the downstream-located logic circuits can be adjusted accordingly. Such a situation is illustrated in FIG. 6 where one terminal 150 is connected with nine other terminals, such as terminal 152 via a fusion coupler 154 and has one bypass line 156. The terminal 150 can include any number of bypass lines and can be associated with any number of bypass lines and can be associated with any number of other terminals, and the FIG. 6 configuration is shown only for the purpose of illustration, and is not intended as being limiting. The terminals can be bidirectional in nature to provide such connectivity. FIG. 11 is a bidirectional terminal which loopback provided to circumvent failure of the network if an entire cable assembly is severed. FIG. 17 is the schematic of a bidirectional terminal utilizing optical logic and optical amplifiers. Also shown is an optional optical isolator which may be utilized to suppress spurious reflections or optical feedback to the amplifier. Each of the terminals will include a logic circuit, such as logic circuit 160 of the terminal 150, connected to the other terminals as described above and adjusted accordingly to receive data from photodiodes in each of the lines connected to the terminal, such as photodiodes 32, 38 and 84. An application of the above-describe system can be found in distributing data in an optical format between a computer or signal processor elements or modules. As discussed above, the system can be embedded on a substrate and can be used in modular form. Such modular form is indicated in FIGS. 7-9. These figures do not include all of the elements, but only the optical fibers and the elements not mentioned above in the interest of clarity. However, those skilled in the art will be able to include the necessary elements in such modular configurations based on the above disclosure.

The module will include an optical backplane which includes optical fibers 160 which can be either multimode or single mode and which are embedded in a panel 162 formed of composite, ceramic or other such material to form a monolithic structure.

FIG. 8 shows an embodiment which includes a wire wrap system with optical fibers 166 interspaced between pins 168 with a flowed-on polymer on polymer or organic backfill 170 to provide a monolithic backplane.

FIG. 9 shows the systems as including a connector system so optical as well as electrical signals can be interfaced in a single module. In this manner, power, signals, and/or ground can all be interconnected to the module. Guide pins 172 can also be included as well as means 174 for connecting electronic modules to the optical modules.

The above illustration of the invention is intended to be illustrative only and is not intended to limit the scope of the invention as defined in the appended claims.

I claim:

1. A fault tolerant fiber optic network for transmitting analog and digital information comprised of a plurality of network nodes interconnected by optical fibers and connectors with each network node consisting of;
   a terminal consisting of an assembly of electronic, electrooptic, and optical elements in a suitable mechanical enclosure supplied by a power source;
   a primary input optical fiber connected to said terminal for conducting a primary optical signal to said terminal;
   bypass optical fiber(s) connected to said terminal for conducting a bypass optical signal to said terminal;
   a data input/output device connected to said terminal;
   photodetector(s) for receiving the optical signals at each terminal from the primary or bypass fiber(s);
   a coupler for the purpose of dividing the primary optical signal according to a predetermined ratio and sending the divided signal to the primary and bypass fiber(s);
   an amplifier for boosting power in the primary input fiber;
   a means for reshaping or retiming the primary input signal prior to amplification if required;
   a logic means for determining the power in the primary and bypass fiber(s) and comparing the power to a fixed or programmable reference level and accepting or rejecting the signal based upon adherence to the reference criteria;
   a built-in-test circuit connected to said terminal which provides an indication of a fault in a terminal or interconnecting fiber(s) and passes this information on to the other terminals of the network; and
   a switching means for switching the signal of the selected bypass fiber to the terminals in the event that the signal of the primary fiber does not fall within the prescribed reference level.

2. The network of claim 1 wherein optical amplifiers are utilized to amplify the signal in the primary input fiber.

3. The network in claim 2 further including optical isolators for the purpose of avoiding spurious reflections or feedback into the optical amplifiers.

4. The network in claim 1 wherein optical logic is utilized as the logic means for detecting the signal strength and switching from the primary fiber to the bypass fiber in the event of a failure in an upstream terminal.

5. The network in claim 1 where the logic means consists of electronic comparators utilized to activate integrated optic switches.

6. The network in claim 1 where the logic means consist of bistable optical elements.

7. The network in claim 1 where the logic means consists of optical threshold switches.

8. The network of claim 1 wherein optical switches are utilized as the switching means.

9. The network of claim 1 wherein electronic switches are utilized as the switching means.

10. The network of claim 1 which utilizes a light emitting diode (LED) array as the means of boosting the signal in the primary optical signal fiber and serves as a means for providing increased fanout to additional terminals.

11. The network of claim 1 which utilizes a laser diode array as the means of boosting the signal in the primary optical signal fiber and serves as a means for providing increased fanout to additional terminals.

12. The network of claim 1, which utilizes planar optical waveguides as the primary and bypass lines.

13. The network of claim 1, wherein the primary optical fiber is bidirectional.

14. The network of claim 1, wherein the bypass optical fibers are bidirectional.

15. The network of claims 1 which includes the use of a switched redundant primary fiber to provide for failure of the primary fiber between terminals.

16. The network of claim 1 which includes the use of multiple switched redundant primary fibers to provide for failure of the primary fiber between terminals.

17. The network of claim 1 wherein an analog or digital correlator is utilized as the logic means to compare the data in the primary and bypass fibers.

* * * * *